United States Patent [19]

Covey et al.

[11] Patent Number: 4,573,794
[45] Date of Patent: Mar. 4, 1986

[54] ANALYTICAL INSTRUMENT OPTICAL ELEMENT SUPPORT SYSTEM

[76] Inventors: Joel P. Covey; Allen J. Zerbel, both of Madison, Wis.

[21] Appl. No.: 471,733

[22] Filed: Mar. 3, 1983

[51] Int. Cl.⁴ .............................................. G01B 9/02
[52] U.S. Cl. .................................... 356/346; 248/487; 350/634
[58] Field of Search ....................... 356/346, 332, 334; 350/633, 634, 252; 248/278, 487

[56] References Cited

U.S. PATENT DOCUMENTS

| | | | |
|---|---|---|---|
| 3,601,476 | 8/1971 | Mackenzie | 350/634 |
| 3,897,139 | 7/1975 | Caruolo et al. | 350/633 |
| 4,053,231 | 10/1977 | Fletcher et al. | 356/346 X |
| 4,088,396 | 5/1978 | Edelstein | 350/252 |
| 4,278,324 | 7/1981 | Zipfel | 350/633 |
| 4,293,112 | 10/1981 | Horton | 350/634 X |

Primary Examiner—Davis L. Willis
Assistant Examiner—Matthew W. Koren
Attorney, Agent, or Firm—Kinney & Lange

[57] ABSTRACT

A system for supporting and spatially orienting an optical element within an analytical instrument, the instrument being of the type having a source of analytical radiation and optical elements for directing the radiation through the instrument. A planar base is secured within the instrument while a support plate carries an optical element to be supported within the instrument. A member spaces one support plate portion from the base while allowing a spatial reorientation of the support plate around the spaced support plate portion. First and second point contact systems adjustably space different support plate portions from the base. The support plate is resiliently biased toward the base with the adjustable point contacts establishing the spacial orientation of the support plate, and thus the optical element, relative to the base. In a preferred embodiment, a spherical pivot spaces the one support plate portion from the base while cooperating cylindrical and conical members establish the first and second point contacts for support plate reorientation. This system also prevents rotation of the support plate relative to the base.

14 Claims, 3 Drawing Figures

ANALYTICAL INSTRUMENT OPTICAL ELEMENT SUPPORT SYSTEM

DESCRIPTION

Background of the Invention

Optical analytical instruments are known to the prior art. An interferometer is an example of such an instrument which has been in use, in various forms, since prior to the turn of the century.

Interferometers, as well as other optical analytical instruments, have a source of analytical radiation and various optical elements positioned within an optical path of the instrument. The optical elements may include reflecting and refracting elements, some of which may be moved along the optical path to vary the path length of at least a part of the analytical radiation. Proper alignment of the optical elements relative to each other is necessary for proper instrument operation.

In modern instruments, proper optical element alignment tends to have its greatest effect on the sensitivity of the instrument, as opposed to the operability of the instrument. However, sensitivity may affect the application of an instrument to a particular measurement.

Another factor bearing on instrument application is the intensity of the source of analytical radiation, particularly when the sources of a desired analytical radiation have practical limits as to their output. An example of such an analytical radiation limitation within an analytical instrument is found in the context of an infrared spectrometer employing an interferometer within its operating system. Proper alignment of the optical elements employed within such a spectrometer will optimize the instrument's sensitivity within the limits imposed by practical radiation sources.

BRIEF SUMMARY OF THE INVENTION

The present invention provides an improved system for supporting an optical element operable upon analytical radiation employed by an analytical instrument. The present invention will be described within the context of a planar reflecting element, and has particular utility in the context of the reflecting element within the fixed arm of a Michelson interferometer, although its use is not limited to that optical element or analytical instrument. In the context of an interferometer, a generally planar base is secured within the instrument at the nominally desired location of the reflecting element. A support plate carries the optical element and has one portion spaced from the base in a manner which allows a spatial reorientation of the support plate around the spaced support plate portion. Two point contact systems adjustably space different support plate portions from the base while the support plate is resiliently biased toward the base. By adjusting the point contacts, the support plate, and thus the optical element it carries, are spatially reoriented. In a preferred embodiment, a spherical pivot extends from the base to space one support plate portion while means are provided to prevent rotation of the support plate relative to the base around the spherical pivot. The point contacts are established by cooperating cylindrical and conical members which are positioned between the support plate and base and which establish a point contact between themselves. Movement of the conical members along its major axis allows for an adjustment of the orientation of the support plate relative to the base.

DETAILED DESCRIPTION OF THE INVENTION

Figure 1:
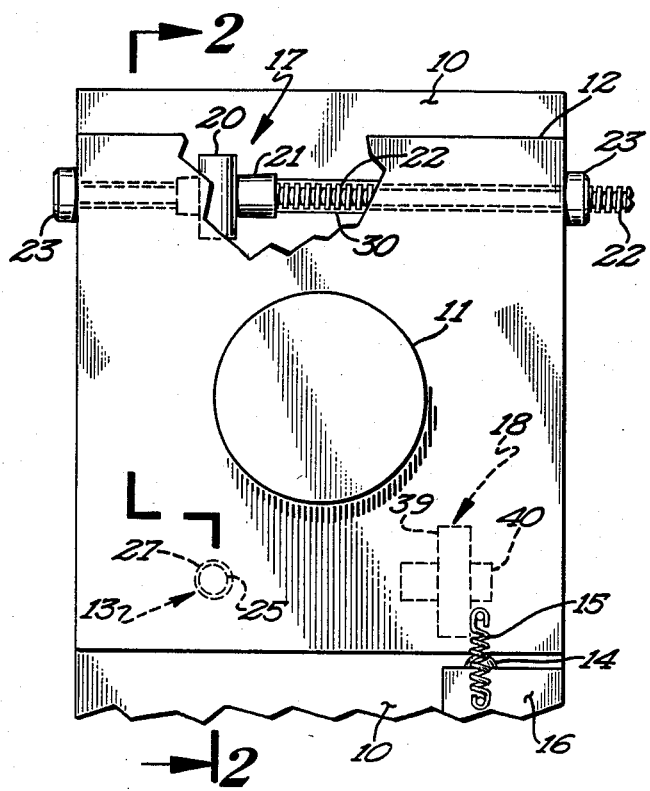
FIG. 1 is a partial cutaway illustrating the cooperation of the various elements forming a preferred embodiment of the present invention.

FIG. 1 is a diagramatic illustration of a preferred embodiment of the present invention including a base member 10. As illustrated, base member 10 is in the form of plate and is adapted to be secured within an analytical instrument. Although illustrated as a plate, that construction is not necessary so long as the base provides three stable points within the instrument for reasons that will be appreciated from the discussion below. An optical element, illustrated as a planar reflecting member 11 in the figures, is secured to a support plate 12 in any known and desired manner. For example, the optical element 11 may be glued to the support plate 12. In the event that the optical element 11 were a refracting element, both of the support plate and base 10 may be provided with an aperture to permit the passage of analytical radiation in known manner.

As will be appreciated from the following discussion, the support plate 12 is oriented relative to the base 10 by controlling the spacing between the support plate 12 and base 10 at three locations. One support plate portion is spaced from the base 10 by a spherical pivot indicated generally at 13 in FIG. 1, spherical pivot 13 being described more fully below. Rotation of the support plate 12 relative to the base 10 about the spherical pivot 13 is prevented by a spherical member 14 which supports the underside of the plate 12 and a spring 15, the spherical member 14 and one end of spring 15 being secured to a projection 16 carried by the base 10. Spherical member 14 and spring 15, while preventing rotation around the spherical pivot 13, allow a relative movement between the plate 12 and base 10 in directions generally perpendicular to the plane of the drawing sheet.

The spherical pivot 13 provides a fixed spacing of one portion of the plate 12 from base 10. Adjustable spacing between different support plate portions and the base are provided by point contact systems indicated generally at 17 and 18. Except as noted below, point contact systems 17 and 18 may be identical. For this reason, only one is shown in detail.

Still referring to FIG. 1, a generally cylindrical member 20 is carried by the plate 12 intermediate the plate 12 and the base 10. A conical member 21 is threadedly engaged by a lead screw 22, the lead screw 22 being supported for rotation by bearings 23 carried by the base 10. On rotation of the lead screw 22, the conical member 21 will travel along the lead screw 22 with the combined diameters of the cylindrical member 20 and that portion of the conical member 21 in contact with the cylindrical member 20 establishing the spacing between the plate 12 and base 10 at their location. As will be described with reference to FIG. 2, the conical member 21 is prevented from rotating with the threaded lead screw 22 to assure its travel along the lead screw 22 on lead screw rotation. Bearings 23 may be of any known design and rotation of the lead screw 22 may be effected by any known technique, stepper motors and appropriate control systems for such motors being preferred within the context of the present invention.

Figure 2:
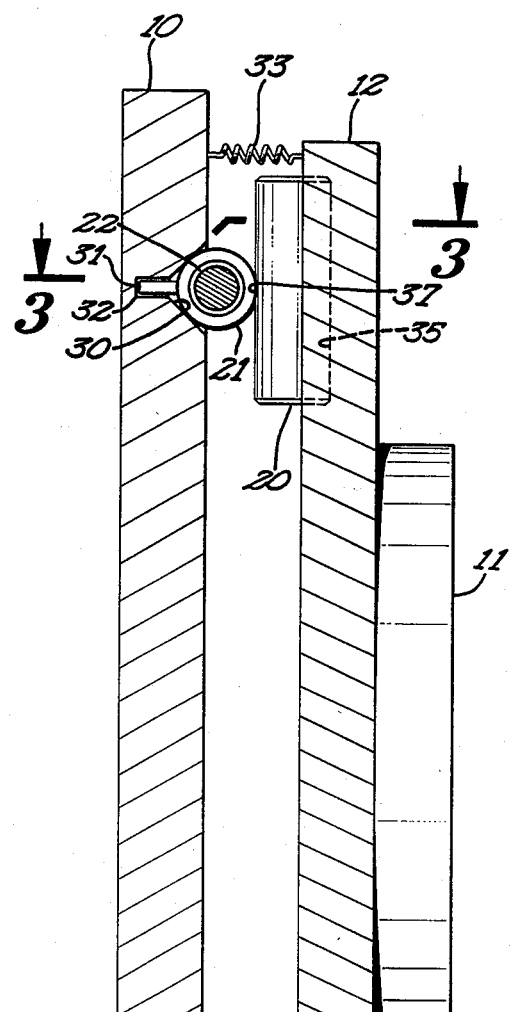
FIG. 2 is a cross section taken along the line 2—2 in FIG. 1.

FIG. 2 illustrates a cross section taken along the line 2—2 in FIG. 1 and better shows the cooperation between some of the elements forming a part of the present invention. As shown in FIG. 2, a spherical pivot 13 is formed of a post 25 secured to and extending from the base 10 and having a spherical terminus 26 lying within a conical recess 27 within the support plate 12. The spherical pivot 13 provides a known spacing between the support plate 12 and base 10 while allowing a pivoting or tilting of the support plate 12 relative to the base 10. In the illustrated configuration, a circular line contact is established between the spherical terminus 26 and conical recess 27.

As illustrated in FIG. 2, the conical member 21 lies within a groove 30 within the base 10 and has a pin 31 extending into a further groove 32, the pin 31 and groove 32 cooperating to prevent rotation of the conical member 21 on rotation of the lead screw 22. The conical member 21 is supported by the lead screw 22, the lead screw 22 being sufficiently rigid for that purpose. The supporting plate 12 is resiliently biased toward the base 10 by springs 33, it being contemplated that one spring 33 positioned at or adjacent each of the systems 13, 17, and 18 is sufficient to maintain the contacts between the elements discussed herein.

Figure 3:
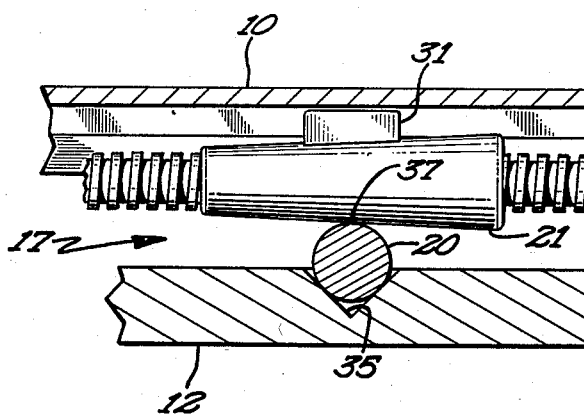
FIG. 3 is a cross section taken along the line 3—3 in FIG. 2.

FIG. 3 further illustrates the cooperation between the conical member 21, lead screw 22 and elements of the base 10 as well as the interaction between the cylindrical member 20 and supporting plate 12 and the cylindrical member 20 and conical member 21. A "V" groove is provided within the supporting plate 12 and establishes line contacts, at 36, between the walls of the groove and the cylindrical member 20. The cylindrical member and the conical member 21 contact at a point contact indicated at 37. Thus, a precise relationship may be established between the conical member 21, cylindrical member 20 and supporting plate 12 to establish a precise spacing between that portion of the supporting plate 12 and base 10 at the location of the noted elements.

Again referring to FIG. 1, the point contact indicated generally at 18 and shown in phantom includes elongated elements 39 and 40. It is contemplated that elements 39 and 40 will include a cylindrical and a conical member such as 20 and 21 illustrated and described herein. Elongated member 39 may be either cylindrical or conical with element 40 taking the other configuration. By driving the conical member along its major access across the major access of the cylindrical member, the spacing between the supporting plate 12 and base 10 may be adjusted at their location.

Obviously, many modifications and variations of the present invention are possible in light of the above teachings. For example, it is presently contemplated that element 40 will be a conical member driven along its major access by a lead screw generally parallel to lead screw 22 (see FIG. 1). However, element 40 may be generally cylindrical with element 39 being conical and driven by a lead screw orthogonal to lead screw 22. Indeed, the cylindrical and conical members forming the point contacts are described and shown as being orthogonal although their cooperation requires only that their major axes intersect to establish a point contact to reduce the tendency of a mechanism to rock during angular reorientation of the supporting plate 12 relative to the base 10. It is therefore to be understood that, within the scope of the appended claims, the invention may be practiced, otherwise than that specifically described.

What is claimed is:

1. In an analytical instrument of the type having a source of analytical radiation and having optical elements for directing said radiation through said instrument, an improved system for supporting and spatially orienting an optical element carried by a support plate which comprises:

planar base means secured within said instrument;

means carried by said base means for spacing one support plate portion from said base means while allowing a spatial reorientation of said support plate around said support plate portion;

first and second point contact means adjustably spacing different support plate portions from said base means, each of said first and second point contact means comprising generally cylindrical means and generally conical means having their major axes non-parallel and contacting each other at a point at their periphery with at least one of said cylindrical means and conical means being movable relative to the other; and means resiliently biasing said base means and support plate toward each other.

2. The analytical instrument of claim 1 wherein said means for spacing one support plate portion comprises spherical pivot means and further comprising means for preventing rotation of said support plate relative to said base means around said spherical pivot means.

3. The analytical instrument of claim 1 wherein at least one of said generally cylindrical means and generally conical means is movable along its major axis.

4. The analytical instrument of claim 1 wherein said generally cylindrical means and generally conical means of each point contact means are positioned generally orthogonally to each other between said base means and support plate, said conical means being movable relative to said cylindrical means along their major axis.

5. The analytical instrument of claim 4 further comprising rotatable lead screw means threadedly engaging said conical means along their major axis and means for preventing rotation of said conical means with said lead screw means.

6. The analytical instrument of claim 5 wherein said conical means major axes are generally parallel.

7. The analytical instrument of claim 5 wherein said conical means major axes are generally perpendicular.

8. The analytical instrument of claim 5 wherein said means for spacing one support plate portion comprises spherical pivot means and further comprising means for preventing rotation of said support plate relative to said base means around said spherical pivot means.

9. The analytical instrument of claim 5 further comprising rotatable lead screw means threadedly engaging said conical means along their major axis and means for preventing rotation of said conical means with said lead screw means.

10. The analytical instrument of claim 9 wherein said rotation preventing means comprise groove means within said base means and means extending from said conical means into said groove means.

11. The analytical instrument of claim 10 wherein said conical means major axes are generally parallel.

12. The analytical instrument of claim 10 wherein said conical means major axes are generally perpendicular.

13. The analytical instrument of claim 1 wherein:
said support plate comprises means establishing line contact with said generally cylindrical means; and
said generally conical means is supported between said base means and cylindrical means and movable along its major axis across the major axis of the cylindrical means with which it is in point contact.

14. The analytical instrument of claim 13 wherein said means for spacing one support plate portion comprises spherical pivot means and further comprising means for preventing rotation of said support plate relative to said base means around said spherical pivot means.

* * * * *